US007304115B2

(12) United States Patent
Van Gool et al.

(10) Patent No.: US 7,304,115 B2
(45) Date of Patent: Dec. 4, 2007

(54) FLUOROPOLYMER COAGULATION METHOD AND COMPOSITION

(75) Inventors: Guy Van Gool, Melsele (BE); Alain Verschuere, Ghent (BE); Werner M. A. Grootaert, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 401 days.

(21) Appl. No.: 11/025,290

(22) Filed: Dec. 29, 2004

(65) Prior Publication Data

US 2005/0143523 A1 Jun. 30, 2005

Related U.S. Application Data

(60) Provisional application No. 60/533,462, filed on Dec. 30, 2003.

(51) Int. Cl.
C08F 216/12 (2006.01)
(52) U.S. Cl. ................ 526/247; 526/242; 526/248; 526/254
(58) Field of Classification Search .............. 526/242, 526/247, 248, 254
See application file for complete search history.

(56) References Cited

U.S. PATENT DOCUMENTS

| 3,523,132 | A | 8/1970 | Dorfman et al. |
| 3,546,186 | A | 12/1970 | Gladding et al. |
| 3,686,143 | A | 8/1972 | Bowman |
| 3,740,369 | A | 6/1973 | Proskow |
| 3,752,787 | A | 8/1973 | Brunner |
| 4,035,565 | A | 7/1977 | Apotheker et al. |
| 4,259,463 | A | 3/1981 | Moggi et al. |
| 4,281,092 | A | 7/1981 | Breazeale |
| 4,287,320 | A | 9/1981 | Kolb |
| 4,335,238 | A | 6/1982 | Moore et al. |
| 4,487,903 | A | 12/1984 | Tatemoto et al. |
| 4,550,132 | A | 10/1985 | Capriotti |
| 4,564,662 | A | 1/1986 | Albin |
| 4,645,799 | A | 2/1987 | Wachi et al. |
| 4,649,045 | A | 3/1987 | Gaske et al. |
| 4,677,137 | A | 6/1987 | Bany et al. |
| 4,734,465 | A | 3/1988 | Moggi et al. |
| 4,758,618 | A | 7/1988 | Ito et al. |
| 4,762,891 | A | 8/1988 | Albin et al. |
| 4,833,212 | A | 5/1989 | Yamada et al. |
| 4,882,390 | A | 11/1989 | Grootaert et al. |
| 4,912,171 | A | 3/1990 | Grootaert et al. |
| 4,948,853 | A | 8/1990 | Logothetis |
| 4,972,038 | A | 11/1990 | Logothetis |
| 4,983,680 | A | 1/1991 | Ojakaar |
| 5,032,655 | A | 7/1991 | Moore |
| 5,077,178 | A | 12/1991 | Herbert et al. |
| 5,262,490 | A | 11/1993 | Kolb et al. |
| 5,266,650 | A | 11/1993 | Guerra et al. |
| 5,268,405 | A | 12/1993 | Ojakaar et al. |
| 5,284,611 | A | 2/1994 | Grootaert et al. |
| 5,285,002 | A | 2/1994 | Grootaert |
| 5,319,025 | A | 6/1994 | Weigelt |
| 5,349,093 | A | 9/1994 | Oka et al. |
| 5,371,143 | A | 12/1994 | Novak et al. |
| 5,378,782 | A | 1/1995 | Grootaert et al. |
| 5,384,374 | A | 1/1995 | Guerra et al. |
| 5,451,625 | A | 9/1995 | Fukushi |
| 5,527,861 | A | 6/1996 | Logothetis |
| 5,554,680 | A | 9/1996 | Ojakaar |
| 5,565,512 | A | 10/1996 | Saito et al. |
| 5,585,449 | A | 12/1996 | Arcella et al. |
| 5,591,804 | A | 1/1997 | Coggio et al. |
| 5,621,145 | A | 4/1997 | Saito et al. |
| 5,639,837 | A | 6/1997 | Farnham et al. |
| 5,654,375 | A | 8/1997 | Jing et al. |
| 5,681,881 | A | 10/1997 | Jing et al. |
| 5,700,879 | A | 12/1997 | Yamamoto et al. |

(Continued)

FOREIGN PATENT DOCUMENTS

EP 0 140 207 A2 5/1985

(Continued)

OTHER PUBLICATIONS

Brown et al., "Reactions of Perfluoroalkyl Nitriles. V. Synthesis of Perfluoroacyl Imidates", J. Org. Chem., vol. 30, (1965), pp. 3724-3728.

(Continued)

Primary Examiner—Bernard Lipman
(74) Attorney, Agent, or Firm—Dena M. Ehrich; C. Michael Geise

(57) ABSTRACT

Provided is a method of manufacturing a perhalogenated elastomer comprising using an onium compound to coagulate a latex comprising polymer particles, the polymer particles consisting essentially of interpolymerized units of one or more perhalogenated comonomer(s) and at least one cure site monomer, wherein the coagulation is performed essentially free of metal ions and metal salts. Also provided is an elastomeric composition comprising a curable perhalogenated elastomer comprising interpolymerized units derived from a nitrogen-containing cure site monomer and coagulated with an onium compound, wherein the elastomer is capable of curing without adding further components and wherein the composition is essentially free of metal ions and metal salts. Also provided are fluoropolymer articles and methods of making fluoropolymer compositions and articles.

14 Claims, No Drawings

U.S. PATENT DOCUMENTS

| | | | |
|---|---|---|---|
| 5,728,773 | A | 3/1998 | Jing et al. |
| 5,756,588 | A | 5/1998 | Kolb et al. |
| 5,767,204 | A | 6/1998 | Iwa et al. |
| 5,789,489 | A | 8/1998 | Coughlin et al. |
| 5,789,509 | A | 8/1998 | Schmiegel |
| 5,824,749 | A | 10/1998 | Sonoi et al. |
| 5,877,264 | A | 3/1999 | Logothetis et al. |
| 5,880,204 | A * | 3/1999 | McCarthy et al. .......... 524/520 |
| 5,891,965 | A | 4/1999 | Worm et al. |
| 5,910,552 | A | 6/1999 | Saito et al. |
| 6,077,609 | A | 6/2000 | Blong et al. |
| 6,114,452 | A | 9/2000 | Schmiegel |
| 6,211,319 | B1 | 4/2001 | Schmiegel |
| 6,255,535 | B1 | 7/2001 | Schulz et al. |
| 6,255,536 | B1 | 7/2001 | Worm et al. |
| 6,270,901 | B1 | 8/2001 | Parsonage et al. |
| 6,281,296 | B1 | 8/2001 | MacLachlan et al. |
| 6,294,627 | B1 | 9/2001 | Worm et al. |
| 6,465,576 | B1 | 10/2002 | Grootaert et al. |
| 6,482,522 | B1 | 11/2002 | Parsonage et al. |
| 6,582,628 | B2 * | 6/2003 | Kondo et al. ................ 252/511 |
| 6,593,416 | B2 | 7/2003 | Grootaert et al. |
| 6,638,999 | B2 | 10/2003 | Bish et al. |
| 6,657,012 | B2 | 12/2003 | Grootaert et al. |
| 6,657,013 | B2 | 12/2003 | Grootaert et al. |
| 6,720,360 | B1 | 4/2004 | Grootaert et al. |
| 6,794,457 | B2 | 9/2004 | Grootaert et al. |
| 6,803,425 | B2 | 10/2004 | Hintzer et al. |
| 6,844,388 | B2 | 1/2005 | Grootaert et al. |
| 6,846,880 | B2 | 1/2005 | Grootaert et al. |
| 6,887,927 | B2 | 5/2005 | Grootaert et al. |
| 6,890,995 | B2 | 5/2005 | Kolb et al. |
| 6,932,921 | B2 * | 8/2005 | Service ....................... 252/500 |
| 7,192,536 | B2 * | 3/2007 | Service ....................... 252/500 |
| 2002/0026014 | A1 | 2/2002 | Bish et al. |
| 2002/0061977 | A1 | 5/2002 | Grootaert et al. |
| 2002/0145228 | A1 | 10/2002 | Kolb et al. |
| 2002/0177666 | A1 | 11/2002 | Grootaert et al. |
| 2004/0044139 | A1 | 3/2004 | Grootaert et al. |

FOREIGN PATENT DOCUMENTS

| | | |
|---|---|---|
| EP | 0 429 250 A2 | 5/1991 |
| EP | 0 584 678 A1 | 3/1994 |
| EP | 0 661 304 A1 | 7/1995 |
| EP | 0 708 084 A1 | 4/1996 |
| EP | 0 708 139 A1 | 4/1996 |
| EP | 0 727 413 A1 | 8/1996 |
| EP | 0 754 721 A2 | 1/1997 |
| EP | 0 758 668 A2 | 2/1997 |
| EP | 0 769 521 A1 | 4/1997 |
| EP | 0 784 064 A1 | 7/1997 |
| EP | 1 182 230 A1 | 2/2002 |
| JP | 9-183879 | 7/1997 |
| JP | 2004-285264 | 10/2004 |
| WO | WO 90/14368 | 11/1990 |
| WO | WO 98/54253 A1 | 12/1998 |
| WO | WO 99/48939 | 9/1999 |
| WO | WO 00/09569 | 2/2000 |
| WO | WO 00/09603 | 2/2000 |
| WO | WO 01/02448 A1 | 1/2001 |
| WO | WO 01/05710 A1 | 1/2001 |
| WO | WO 01/57100 A1 | 8/2001 |
| WO | WO 01/59005 A2 | 8/2001 |
| WO | WO 02/060969 A1 | 8/2002 |
| WO | WO 2005/000917 A1 | 1/2005 |

OTHER PUBLICATIONS

Yakubovich et al., "Syntheses in the 1,3,5-Triazine Series V. Iminoesters of Perfluorocarboxylic Acids-Synthese, Properties, and Mechanism of Cyclopolymerization to 1,3,5-Triazine Derivatives", pp. 878-885, (translated from Zhurnal Obshchei Khimii, vol. 36, No. 5, pp. 863-871, May 1966).

Grinblat et al., "Infrared Investigation of The Vulcanization of Perfluoroalkylenetriazine Polymers", Polymer Science U.S.S.R., vol. 21, 1980, pp. 1434-1441.

Paciorek et al., "Reactions of Perfluoronitriles. I. Interactions with Aniline", Journal of Fluorine Chemistry, 30 (1985), pp. 241-250.

* cited by examiner

FLUOROPOLYMER COAGULATION METHOD AND COMPOSITION

CROSS REFERENCE TO RELATED APPLICATION

This application claims the benefit of U.S. Provisional Application No. 60/533462, filed Dec. 30, 2003, which is herein incorporated by reference.

TECHNICAL FIELD

This invention relates to coagulation of fluoropolymers and coagulated compositions.

BACKGROUND

Aqueous emulsion polymerization can be used to produce an aqueous latex of curable compositions of partially-fluorinated copolymers. Coagulating and isolating or separating an elastic copolymer of vinylidene fluoride and at least one fluorinated olefin from an aqueous latex by first adding a salt of a poly-hydroxyl compound or a quaternary compound mixture containing the poly-hydroxyl compound and either nitrogen or phosphorous vulcanizing components and second, adding an acid for coagulation, has also been described.

It is known to remove metal ions from fluoroplastics via acid washing, however, such solutions may react with cure sites of fluoroelastomers and/or limit the efficacy or destroy the purpose of these cure sites. Generally, metal ions are among the undesirable impurities found in fluoropolymers. The semiconductor industry finds such metal ions particularly undesirable.

SUMMARY OF INVENTION

The present inventors have discovered a solution to provide perfluoroelastomers essentially free of metal salts and metal ions. Briefly, the present invention provides a method of manufacturing a perhalogenated elastomer comprising coagulating a latex comprising polymer particles using an onium compound as a coagulating agent, the polymer particles consisting essentially of interpolymerized units of one or more perhalogenated comonomer(s) and at least one cure site monomer, wherein the coagulation is performed essentially free of metal ions and metal salts.

In another aspect, the invention provides a method of manufacturing a perhalogenated elastomer, such as a perfluoroelastomer, comprising providing a polymer latex with interpolymerized units of one or more perhalogenated or perfluorinated comonomer(s) together with interpolymerized units of at least one cure site monomer, coagulating the latex using an onium compound, wherein coagulating is preformed essentially free of metal ions and metal salts, washing the coagulated latex, and optionally drying the coagulated latex. In one aspect, the latex can be provided by polymerizing one or more perhalogenated or perfluorinated comonomer(s) together with at least one cure site monomer in an aqueous medium with a fluorinated emulsifier and an initiator.

In another aspect, the present invention provides an elastomeric composition comprising a curable perhalogenated polymer, such as a perfluoropolymer, comprising interpolymerized units derived from a nitrogen- or nitrile-containing cure site monomer, wherein the polymer is coagulated with an onium compound, and wherein the polymer is capable of curing without adding further components and wherein the composition is essentially free of metal ions and metal salts.

In another aspect, the invention provides a method of making a fluoropolymer composition comprising providing a curable perhalogenated polymer, such as a perfluoropolymer, comprising interpolymerized units derived from a cure site monomer, wherein the polymer is coagulated with an onium compound; curing the polymer, optionally without adding further components, wherein the composition is essentially free of metal ions and metal salts; curing the composition, such as via heat; and optionally post curing and/or heat aging the cured composition.

It is an advantage of one aspect of the present invention to provide a coagulation method that minimizes or eliminates the introduction of metal ions. It is an advantage of another aspect of the invention to provide a curable fluoropolymer composition essentially free of metal ions and essentially free of metal salts. It is an advantage of another aspect of the invention to provide a self-curable fluoropolymer composition. In addition, the fluoropolymers of the invention generally have improved cure speed and improved scorch safety as compared to known fluoropolymer systems.

Other features and advantages of the invention will be apparent from the following detailed description of the invention and the claims. The above summary of principles of the disclosure is not intended to describe each illustrated embodiment or every implementation of the present disclosure. The detailed description that follows is intended to more particularly exemplify certain preferred embodiments using the principles disclosed herein.

DETAILED DESCRIPTION

With the present invention, an effective amount of an onium compound can be used to coagulate perfluoropolymer compositions, thus minimizing or avoiding the introduction of the metal ions and metal salts typically used in prior methods. Thus, in one aspect of the present invention provides a method of manufacturing a perfluoropolymer comprising polymerizing one or more perfluorinated comonomer(s) together with at least one cure site monomer (e.g., a nitrogen-containing cure site monomer) in an aqueous medium with a fluorinated emulsifier and an initiator to form a latex. This latex is then coagulated through the use of an effective amount of an organo-onium compound, to form coagulated latex. This coagulation operation is achieved with minimal metal ions and metal salts. It is generally preferred to avoid any introduction of metal ions and metal salts with the present invention. After coagulation, the coagulated latex is washed one or more times, and the washed latex can be dried when desired. This washing removes anions resulting from the polymerization process. In another embodiment, the latex can be prepared as above except via a system substantially free of fluorinated emulsifier. That is, in a system having below about 0.5 wt %, more preferably below about 0.1, or sometimes more preferably below about 0.5 wt % of a fluorinated emulsifier. Such a system may have even less fluorinated emulsifier, such as a level (wt %) below about 0.1, below about 0.001, or even zero.

An effective amount of organo-onium compound typically means a level of onium that coagulates the perfluoropolymer in the desired process conditions. For example, a lower amount may coagulate but be less efficient by requiring more time, a greater amount also may coagulate but may add unnecessary expense or may result in a perfluoropolymer that cures without additional materials and having increased scorching character. Generally, an effective amount is at least about 1 to 2 mmole per 100 grams dry polymer (mmhr), more preferably at least about 3.5 mmhr, or even at least about 8.5 mmhr. In other aspects, an effective amount is preferably at least about 4 mmhr to about 6 mmhr. In other aspects, an effective amount is preferably below about 20 mmhr, more preferably below about 10 mmhr.

The composition of the present invention comprises a curable perfluoropolymer comprising interpolymerized units derived from a cure site monomer. The composition is essentially free of metal ions and metal salts. In another aspect, composition of the present invention comprises a self-curable perfluoropolymer comprising interpolymerized units derived from a nitrogen-containing cure site monomer, such as a nitrile-containing cure site monomer. In this aspect, the perfluoropolymer can be compounded with additional materials, optionally including a curative, although the perfluoropolymer will cure without adding a curative.

In the present invention, suitable fluoropolymers include interpolymerized units derived from a cure site monomer and, preferably, at least two principal monomers. Examples of suitable candidates for the principal monomer include perhaloolefins (e.g., tetrafluoroethylene (TFE) and hexafluoropropylene (HFP)), chlorotrifluoroethylene (CTFE), and perfluoroalkeneethers (e.g., perfluoro(alkyl vinyl) ethers and perfluoro(alkoxy vinyl) ethers).

The perhalogenated fluoropolymer is preferably perfluorinated, and it often contains at least about 50 mole percent (mol %) of its interpolymerized units derived from TFE, CTFE, or a combination thereof, and optionally includes HFP. The balance of the interpolymerized units of the perfluoropolymer (10 to 50 mol %) comprises one or more perfluoro (vinyl ethers) and a cure site monomer (as described below). The cure site monomer makes up from about 0.1 to about 5 mol % (more preferably from about 0.3 to about 2 mol %) of the polymer.

Suitable perfluorinated vinyl ethers include those of the formula:

   (I)

wherein $R^2_f$ and $R^3_f$ are the same or are different linear or branched perfluoroalkylene groups of 1-6 carbon atoms; a and b are, independently, 0 or an integer from 1 to 10; and $R^4_f$ is a perfluoroalkyl group of 1-6 carbon atoms. One preferred class of perfluoro(alkyl vinyl)ethers includes compositions of the formula:

   (II)

wherein X is F or $CF_3$; d is 0-5, and $R^4_f$ is a perfluoroalkyl group of 1-6 carbon atoms. More preferred perfluoro(alkyl vinyl) ethers are those where, in reference to either Formula (I) or Formula (II), described above, d is 0 or 1 and each $R^2_f$, $R^3_f$, and $R^4_f$ contains 1-3 carbon atoms. Examples of such perfluorinated ethers include perfluoro(methyl vinyl)ether, perfluoro(ethyl vinyl)ether, and perfluoro(propyl vinyl)ether.

Other useful perfluorinated monomers include those compounds of the formula:

   (III)

wherein $R^4_f$ is a perfluoroalkyl group having 1-6 carbon atoms, e is 1-5, g is 0-5, h is 0-5, and Z is F or $CF_3$. Preferred members of this class are those in which $R^4_f$ is $C_3F_7$, e is 1 or 2, g is 0 or 1, and h is 1. Additional perfluoro(alkyl vinyl) ether monomers useful in the invention include those of the formula:

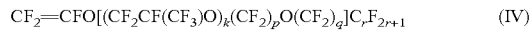   (IV)

wherein k is 0-10, p is 1-6, q is 0-3, and r is 1-5. Preferred members of this class include compounds where k is 0 or 1, p is 1-5, q is 0 or 1, and r is 1.

Useful perfluoro(alkoxy vinyl)ethers include those of the formula:

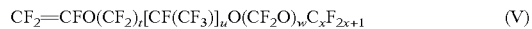   (V)

wherein t is 1-3, u is 0-1, w is 0-3, and x is 1-5, preferably 1. Specific, representative, examples of useful perfluoro (alkoxy vinyl) ethers include $CF_2$=$CFOCF_2OCF_2CF_2CF_3$, $CF_2$=$CFOCF_2OCF_3$, $CF_2$=$CFO(CF_2)_3OCF_3$, and $CF_2$=$CFOCF_2CF_2OCF_3$.

Combinations of perfluoro(alkyl vinyl) ethers and perfluoro(alkoxy vinyl)ethers also may be used.

Perfluoroolefins useful in the invention include those of the formula:

   (VI)

wherein $R^5_f$ is fluorine or a perfluoroalkyl of 1 to 8, preferably 1 to 3, carbon atoms.

One example of a useful fluoropolymer is composed of principal monomer units of tetrafluoroethylene and at least one perfluoro(alkyl vinyl)ether. In such copolymers, the copolymerized perfluorinated ether units constitute from about 10 to about 50 mol % (more preferably 15 to 35 mol %) of total monomer units present in the polymer. The perfluoropolymer preferably comprises from about 0.1 to about 5 mol % of cure site monomer.

One or more other fluoropolymers may be incorporated into the fluoropolymer described above, such as via blending one latex with another or blending powders or pellets. In addition, one or more other fluoropolymers (which may include one or more copolymers) may be blended with the fluoropolymer (which may comprise a copolymer) having interpolymerized units derived from a nitrogen-containing cure site monomer. Such other fluoropolymers useful in a blend and/or copolymer include those known in the art, including homopolymers and copolymers comprising the interpolymerized units mentioned above as well as partially-fluorinated or non-fluorinated interpolymerized units. For example, polytetrafluoroethylene (PTFE) and PFA (tetrafluoroethylene-perfluoro(alkyl vinyl)ether) are useful. The other fluoropolymer(s) may be a perfluoroelastomer or not, and it may lack interpolymerized units derived from a cure site monomer and/or may include reactive sites adapted to a selected curative system. For example, two different fluoropolymers, each having interpolymerized units derived from a cure site monomer, such as a nitrogen-containing cure site monomer which may comprise a nitrile group, may be blended to provide the fluoropolymer for the present invention.

Another fluoropolymer may be included with the fluoropolymer of the present invention along with a suitable curative, such as described below, to provide selected properties. For example, a fluoropolymer suitable for peroxide curing and a peroxide curative may be included to improve chemical stability. Such a blend can be used to balance the thermal stability and the chemical stability of the resultant blend, and also may provide economic benefits. Other curatives also may be used to cure a blend of fluoropolymers having nitrogen-containing cure site monomers without the need to include a fluoropolymer lacking a nitrogen-containing cure site monomer.

The perfluoropolymer(s) having cure site monomers preferably make up enough of the total composition to provide increased thermal stability over a comparative fluoropolymer that lacks the composition of the present invention. This amount is generally at least 25 weight percent (wt %), more preferably at least 50 wt %, of the total fluoropolymer in the composition of the invention.

The perfluoropolymers of the invention are made via known routes, with a few exceptions. For example, the polymerization process can be carried out by free-radical polymerization of the monomers as an aqueous emulsion polymerization or as a solution polymerization in an organic solvent. When fluoropolymer blends are desired, a preferable route of incorporation is through blending the fluoropolymer latices in the selected ratio, followed by coagulation and drying. With the present invention, the coagulation operation is modified as described herein.

The nature and the amount of end groups are not critical to the success in curing the fluoroelastomers of the invention. For example, the polymer can contain $SO_3^{(-)}$ end groups generated by an ammonium persulfate (APS)/sulfite initiator system, or the polymer may contain $COO^{(-)}$ end groups generated by an APS initiator system or the fluoroelastomer can have "neutral" end groups, e.g., those generated by the use of fluorosulfinate or organic peroxide initiator systems. Chain transfer agents of any kind can significantly reduce the number of end groups.

The cure site component, or cure site monomer, allows one to cure the perfluoropolymer of the present invention. In one embodiment, at least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrogen-containing cure site monomers include nitrile-containing fluorinated olefins and nitrile-containing fluorinated vinyl ethers, such as $CF_2=CFO(CF_2)_LCN$, $CF_2=CFO[CF_2CF(CF_3)O]_q(CF_2O)_yCF(CF_3)CN$, $CF_2=CF[OCF_2CF(CF_3)]_rO(CF_2)_tCN$, and $CF_2=CFO(CF_2)_uOCF(CF_3)CN$, where, in reference to these formulas, L=2-12; q=0-4; r=1-2; y=0-6; t=1-4; and u=2-6. Representative examples of such cure site monomers include $CF_2=CFO(CF_2)_5CN$, $CF_2=CFO(CF_2)_3OCF(CF_3)CN$, and perfluoro (8-cyano-5-methyl-3,6-dioxa-1-octene).

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Such a monomer can be selected, for example, from the general formula $Z-R_f-O_x-CF=CF_2$, wherein Z is Br or I, $R_f$ is a substituted or unsubstituted $C_1$-$C_{12}$ fluoroalkylene, which may be perfluorinated and may contain one or more ether oxygen atoms, and x is 0 or 1. Examples of the bromo- or iodo-fluorinated olefins include: bromodifluoroethylene, bromotrifluoroethylene, iodotrifluoroethylene, 1-bromo-2,2-difluoroethylene, and 4-bromo-3,3,4,4-tetrafluorobutene-1, and the like, as well as bromo- or iodo-fluorovinyl ethers such as: $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like. Also non-fluorinated bromo- or iodo-olefins, e.g., vinyl bromide and 4-bromo-1-butene, can be used.

The amount of cure site component in a side chain position of the fluoropolymer is generally from about 0.05 to about 5 mol % (more preferably from 0.1 to 2 mol %).

The cure site component may also occur in the terminal position of a fluoropolymer chain. Chain transfer agents or initiators can be used to introduce the halogen in a terminal position. Generally, a suitable chain transfer agent is introduced in the reaction medium during polymer preparation, or derived from a suitable initiator.

Examples of useful chain transfer agents include those having the formula $R_fZ_x$ wherein $R_f$ is a substituted or unsubstituted $C_1$-$C_{12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like.

The perfluoropolymer compositions of the present invention are coagulated, at least in part, using an organo-onium composition. Useful onium compounds include those previously described as catalysts or curatives useful in fluoroelastomer compositions. With the present invention, such onium compounds are included in the coagulation operation, yet this leaves the material uncured and self-curable when a nitrogen-containing cure site is used. Advantageously with the present invention, metal salts and metal ions are unnecessary for coagulation. This also enables a perfluoropolymer of high purity and few or no metal salts or metal ions. Of course, no metal extraction means generally are necessary when no metals are included.

In one embodiment, the onium compound useful in the present invention includes a compound having the general formula:

$$R_kQ^{(+)}X^{(-)} \qquad (VII)$$

In Formula VII, Q is phosphorous (P), sulfur (S), nitrogen (N), arsenic (As), or antimony (Sb), and k is one more than the valence of Q. Each R is, independently, an alkyl, aryl, aralkyl, or alkenyl group having from 1 to 20 carbon atoms. In addition, R can be substituted or unsubstituted, fluorinated, or non-fluorinated.

The anion in Formula VII is $^-$OH, Br$^-$, Cl$^-$, HCOO$^-$, R'COO$^-$ or $^-$OR' is R' is a $C_1$-$C_{10}$ alkyl. The alkyl group may be substituted or unsubstituted, fluorinated or nonfluorinated. In one aspect, the preferred anions are hydroxides, carboxylates, and alkoxides.

Preferred oniums include those wherein R is selected from alkyl, benzyl, and phenyl. The onium composition can be purchased or prepared by any known means.

As is known in the art, an organo-onium is the conjugate acid of a Lewis base (e.g., phosphine, amine, and sulfide) and can be formed by reacting the Lewis base with a suitable alkylating agent (e.g., an alkyl halide or acyl halide) resulting in an expansion of the valence of the electron donating atom of the Lewis base and a positive charge on the organo-onium compound. The preferred organo-onium compounds for the present invention contain at least one heteroatom, i.e., a non-carbon atom such as P, S, or N, bonded to organic moieties.

One class of organo-onium compounds particularly useful in the present invention broadly comprises relatively positive and relatively negative ions wherein a phosphorus, sulfur, or nitrogen generally comprises the central atom of the positive ion, and the negative ion is an alkyl or cycloalkyl acid anion that may be non-fluorinated, partially fluorinated, i.e., at least one hydrogen atom is replaced with fluorine, provided that at least one hydrogen atom remains, or perfluorinated.

Examples of suitable phosphorous compounds include tetramethylphosphoniums, tributylallylphosphoniums, tributylbenzylphosphoniums, dibutyldiphenylphosphoniums, tetrabutylphosphoniums, tributyl(2-methoxy)propylphosphoniums, triphenylbenzylphosphoniums, and tetraphenylphosphoniums. These phosphoniums can be hydroxides, chlorides, bromides, alkoxides, phenoxides, etc. The tetraalkyl phosphonium hydroxides and tetraalkyl phosphonium alkoxides are preferred.

Sulfonium compounds useful in this invention have at least one sulfur atom ionically associated with an anion and covalently bonded to three organic moieties (R') by means of carbon-sulfur covalent bonds. These organic moieties can be the same or different. The sulfonium compounds may have more than one relatively positive sulfur atom, e.g., $[(C_6H_5)_2S^+(CH_2)_4S^+(C_6H_5)_2]2Cl^-$, and two of the carbon-sulfur covalent bonds may be between the carbon atoms of a divalent organic moiety, i.e., the sulfur atom may be a heteroatom in a cyclic structure.

A class of sulfonium compounds useful in the present invention are salts having the formula:

(VIII)

wherein each R can be the same or different, provided that at least one of such groups is aromatic, and such groups can be selected from $C_4$-$C_{20}$ aromatic radicals (e.g., substituted and unsubstituted phenyl, thienyl, and furanyl) and $C_1$-$C_{20}$ alkyl radicals. The alkyl radicals include substituted alkyl radicals (e.g., substitutents such as halogen, hydroxy, alkoxy, aryl). Z is selected from oxygen; sulfur; >S=O; >C=O; —SO$_2$—; —NR"—, where R" is aryl or acyl (such as acetyl, benzoyl, etc.); a carbon-to-carbon bond; and —CR$^4$R$^5$— where R$^4$ and R$^5$ are selected from hydrogen, $C_1$-$C_4$ alkyl radicals, and $C_2$-$C_4$ alkenyl radicals. Preferably, the sulfonium compounds include at least one aryl group.

When Q is nitrogen, the preferred positive ion has the general formula is [NR'$_4$]$^+$ or [HNR$_3$]$^+$, wherein R is as described above for Formula VII. Representative quaternary organo-oniums useful as precursor compounds include phenyltrimethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazabicyclo[5.4.0]undec-7-eniums, benzyltris (dimethylamino)phosphoniums, and bis(benzyldiphenyl phosphine)iminiums. These ammoniums can be hydroxides, chlorides, bromides, alkoxides, phenoxides, etc. Of these positive ions, tetrabutylammonium and tetraphenylammonium are preferred.

When Q is As or Sb, the preferred positive ions include tetraphenylarsonium chloride and tetraphenylstibonium chloride.

Overall, the tetraalkylphosphonium compounds are more preferred for the positive ion of the catalyst.

Mixtures of organo-onium compounds are also useful in this invention. The precursors described above are generally commercially available (e.g., from Aldrich Chemicals, Milwaukee, Wis.) or may be prepared by known procedures.

In some embodiments, the perfluoropolymer of the present invention is self curing in that no additional curatives need be added and the perfluoropolymer can be cured through heating. In some embodiments, the perfluoropolymer may be self curing, yet curatives are added to effect different curing characteristics and/or effect changes in the properties of the cured elastomers.

This invention is useful in preparing fluoropolymer compositions, such as fluoroelastomer compositions, and perfluoroelastomer compositions. The fluoropolymer compositions of the invention are essentially free of metal salts and metal ions. Such materials find particular utility in the field of high-purity fluoropolymer applications, for example, in the semiconductor field where metal ions are believed to be detrimental.

Objects and advantages of this invention are further illustrated by the following examples, and the particular materials and amounts thereof recited in these examples, as well as other conditions and details, should not be construed to unduly limit this invention.

EXAMPLES

The indicated results were obtained using the following test methods, unless otherwise noted. The test results appear in the tables below.

Test Methods

Cure rheology: Tests were run on uncured, compounded samples using a Monsanto Moving Die Rheometer (MDR) Model 2000 in accordance with ASTM D 5289-93a at 177° C., no pre-heat, 30 minute elapsed time (unless 12 minutes was noted), and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("Ts2"), the time for the torque to reach a value equal to $M_L$+0.5($M_H$–$M_L$) ("Tc50"), and the time for the torque to reach $M_L$+0.9($M_H$–$M_L$) ("Tc90").

Press-Cure: Sample sheets measuring 150×150×2.0 mm were prepared for physical property determination by pressing at about 6.9 Mega Pascal (MPa) for 15 minutes at 177° C., unless otherwise noted.

Post-Cure: Press-cured sample sheets were exposed to heat under air (16 h at 250° C.). The samples were returned to ambient temperature before testing.

Physical Properties: Tensile Strength at Break, Elongation at Break, and Modulus at 100% Elongation were determined using ASTM D 412-92 on samples cut from the press-cure or post-cure sheet with ASTM Die D. Units are reported MPa.

Hardness: Samples were measured using ASTM D 2240-85 Method A with a Type A-2 Shore Durometer. Units are reported in points on the Shore A scale.

Compression set: O-ring samples were measured using ASTM D395-89 Method B. The O-rings had a cross-sectional thickness of 0.139 in. (3.5 mm.). Results are reported as a percentage of the original deflection.

Materials

All materials were commercially available from Aldrich Chemical Co., Milwaukee, Wis. unless otherwise indicated.

Examples 1-7

A quantity of 15 g of 40% tetrabutylphosphonium hydroxide in water (TBPOH 40%) was added to 500 mL deionized (DI) water. To this mix, a quantity of 600 g of latex (an aqueous latex containing 30 wt % of a copolymer of 65.4 mole percent (mol %) tetrafluoroethylene, 33.3 mol % perfluoromethylvinylether, and 1.3 mol % $CF_2=CFO(CF_2)_5CN$, made via aqueous emulsion polymerization (hereinafter "Latex A")) was added dropwise while stirring. The glassware was rinsed with an additional 30 mL DI water. The blend was filtered through cheesecloth and excess water was removed by squeezing the resulting crumb. The crumb was washed four times by adding it to 1600 mL warm DI water (50-55° C.), stirring for about 10 minutes, then filtering through cheesecloth. The resulting coagulum was dried for 6 h in an oven at 105° C. and then run MDR rheometer traces were carried out at 177° C. (12 min.), 160° C. (30 min.) and 140° C. (60 min.) to evaluate curing properties. Examples 2-7 were carried out as in Example 1 with the amount of TBPOH altered as shown in the Table below. All samples had an off-white color after drying.

TABLE 1

Coagulation & Washing

| | Example: | | | | | | |
|---|---|---|---|---|---|---|---|
| | 1 | 2 | 3 | 4 | 5 | 6 | 7 |
| TBPOH (g) | 15 | 10 | 8 | 6 | 5 | 4 | 2 |
| mmol | 21.75 | 14.5 | 11.6 | 8.7 | 7.2 | 5.8 | 2.9 |
| pH of washing water after coagulation and washing | | | | | | | |
| Coagulation | 3.9 | 3.4 | 3.0 | 2.8 | 2.7 | 2.3 | 2.2 |
| 1st wash | 4.6 | 4.0 | 3.5 | 3.3 | 3.4 | 3.3 | 3.2 |
| 2nd wash | 4.8 | 4.2 | 4.0 | 3.9 | 4.0 | 4.0 | 4.6 |
| 3th wash | 4.7 | 4.4 | 4.2 | 4.2 | 4.2 | 4.6 | 4.9 |
| 4th wash | 4.8 | 4.7 | 4.6 | 4.4 | 4.5 | — | 5.3 |
| Weights (g) | | | | | | | |
| before drying (squeezed) | 251 | 230 | 235 | 245 | 232 | 181 | 87 |
| dried coagulum | 179 | 177 | 176 | 175 | 174 | 133 | 87 |

TABLE 2

Curing Characteristics (12 min.)

| | Example: | | | | | | |
|---|---|---|---|---|---|---|---|
| | 1 | 2 | 3 | 4 | 5 | 6 | 7 |
| $M_L$ (Nm) | 0.14 | 0.13 | 0.12 | 0.12 | 0.12 | 0.12 | 0.11 |
| $M_H$ (Nm) | 0.99 | 0.99 | 0.97 | 0.94 | 0.95 | 0.72 | 0.48 |
| $M_H - M_L$ (Nm) | 0.85 | 0.87 | 0.85 | 0.82 | 0.83 | 0.61 | 0.37 |
| Tan d @ $M_L$ | 0.720 | 0.793 | 0.800 | 0.796 | 0.817 | 0.824 | 0.842 |
| Tan d @ $M_H$ | 0.031 | 0.034 | 0.031 | 0.036 | 0.036 | 0.074 | 0.158 |
| Ts2 (min.) | 2.1 | 2.2 | 2.5 | 3.0 | 3.2 | 4.9 | 8.7 |
| Tc50 (min.) | 3.0 | 3.1 | 3.5 | 3.9 | 4.1 | 5.6 | 8.1 |
| Tc90 (min.) | 6.4 | 6.4 | 6.9 | 7.5 | 7.7 | 9.4 | 10.9 |

Example 8

Example 8 was carried out as in Example 1 except that the amount of TBPOH was 33.3 g, which was added to 1665 mL DI water, and 2000 g Latex A, described above, was added dropwise while stirring. The material was filtered (cheesecloth) and washed as in Example 1 except the fourth washing operation was omitted. The resulting coagulum was dried overnight in an oven held at 105° C. Samples of the initial and aged material were tested and the results are shown in the Table below.

Comparative Examples 1-2 (CE 1 and CE 2)

In CE 1, A quantity of 9 g of magnesium chloride was added to 1500 mL DI water. To this combination, a quantity of 2000 g Latex A, described above, was added dropwise while stirring. The resulting material was filtered washed, and dried as in Example 8. Samples of the initial and aged material were tested and the results are shown in the Table below.

CE 2 was prepared by adding 7.5 g of Catalyst A prepared as described below to 94 g of CE 1 fluoropolymer. Samples were tested as in CE 1 and the results are shown in the Table below. In Table 3, high humidity conditions of 95% relative humidity at room temperature (about 22° C.) were used.

Catalyst A was a blend of 80 wt % PFE 131TX (available from Dyneon) with 20 wt % tetrabutylphosphonium perfluoroadipate, which can be prepared as follows. A 2 L round bottom flask is equipped with magnetic stirring, a temperature probe, and connection to a nitrogen bubbler. The flask is charged with 188 g (0.65 mole) perfluoroadipic acid (made from octafluoroadipoyl fluoride available from SynQuest Laboratories, Inc., Alachua, Fla.) and 488 g of distilled water. While stirring, 898 g (1.3 mole) of a 40 wt % aqueous solution of tetrabutyl ammonium hydroxide (available from Aldrich) is added over 1 h and a slight exothermic reaction is observed. The mixture is stirred for another hour at room temperature (around 23° C.). The flask is heated to 65° C. under a reduced pressure of 15 torr (2 kPa) to remove water and expected to give 523 g (0.65 mole) of $(C_4H_9)_4POOC(CF_2)_4COOP(C_4H_9)_4$ in quantitative yield. The bis-(tetrabutyl phosphonium)-perfluoroadipate has a melting point of 123° C. and FNMR confirms the structure and 2 to 1 molar ratio. Then, a mixture of 80 wt % of the fluoropolymer was blended using a two-roll mill with 20 wt % of the bis-tetrabutyl phosphonium perfluoro adipate to prepare Catalyst A.

TABLE 3

Curing Characteristics (30 min.)

| | Example | | |
|---|---|---|---|
| | 8 | CE 1 | CE 2 |
| Initial | | | |
| $M_L$ (Nm) | 0.09 | NO | 0.05 |
| $M_H$ (Nm) | 0.85 | CURE | 0.93 |
| $M_H - M_L$ (Nm) | 0.75 | | 0.88 |
| Ts2 (min.) | 2.8 | | 8.3 |
| Tc50 (min.) | 3.6 | | 11.5 |
| Tc90 (min.) | 8.3 | | 22.0 |
| After 3 weeks in high humidity storage | | | |
| $M_L$ (Nm) | 0.09 | NO | 0.05 |
| $M_H$ (Nm) | 0.82 | CURE | 0.92 |
| $M_H - M_L$ (Nm) | 0.73 | | 0.87 |
| Ts2 (min.) | 2.9 | | 7.8 |
| Tc50 (min.) | 3.7 | | 10.5 |
| Tc90 (min.) | 8.1 | | 19.5 |
| After 10 weeks in high humidity storage | | | |
| $M_L$ (Nm) | 0.09 | NO | 0.05 |
| $M_H$ (Nm) | 0.76 | CURE | 0.84 |
| $M_H - M_L$ (Nm) | 0.67 | | 0.79 |
| Ts2 (min.) | 3.0 | | 8.2 |

TABLE 3-continued

| | Curing Characteristics (30 min.) | | |
|---|---|---|---|
| | Example | | |
| | 8 | CE 1 | CE 2 |
| Tc50 (min.) | 3.7 | | 10.4 |
| Tc90 (min.) | 7.8 | | 18.5 |

This aspect of the present invention demonstrated that no added curative is required, for the fluoropolymer was self-curing. In addition, traditional routes of fluoropolymer coagulation did not result in a fluoropolymer that would self-cure. Further, this embodiment of the invention provided a self-curing fluoropolymer with excellent shelf life and improved curing properties.

Example 9

A combination of 100 parts per hundred rubber (phr) fluoropolymer of Example 4 was compounded with 40 phr barium sulfate, and 5 phr titanium dioxide.

Comparative Example 3 (CE 3)

This was prepared as in Example 9, except that the fluoropolymer was PFE 131 TX (Dyneon) and 1.5 phr silica filler (available as Aerosil R 972 from Degussa Corp., Parsippany, N.J.), 5 phr catalyst (Dyneon E-18412), and 0.5 phr dimethyl sulfone were added (in addition to the 40 phr barium sulfate and 5 phr titanium dioxide).

Example 10

A combination of 100 phr of the fluoropolymer of Example 4 was compounded with 20 phr FEF N550 carbon black.

Comparative Example 4 (CE 4)

This was prepared as in Example 10, except that 1 phr Catalyst B (tetrabutylphosphonium acetate, prepared as described below) was added (in addition to the 20 phr carbon black).

Catalyst B can be prepared using a mixture of 98.66 g of a 40 wt % solution in water of tetrabutylphosphonium hydroxide (0.143 mol). This is neutralized in a 500 mL flask with 8.6 g of acetic acid (99.7% purity). The mixture is swirled for about 5 minutes (pH paper indicates a pH of 9). Water is removed from the mixture using a rotary evaporator (rotovap) using a bath temp of around 50° C. until no more water condenses. Ethanol (100 mL) is added to the flask and the solution is stripped on the rotovap until no more condensation occurs. Another 100 mL of ethanol is added to the solution, following by stripping on the rotovap until no more condensation occurs. This yields about 60 g of clear, slightly viscous oil. NMR analysis reveals that this oil contains 19% ethanol. Karl-Fisher titration reveals that this oil contained 1.8 wt % water, along with the desired tetrabutylphosphonium acetate.

Cure rheology tests were run on the uncured, compounded samples of Examples 9 and 10 as well as CE 3 and CE 4. A sheet of the compounded admixture of each was pressed cured and tested and subsequently post-cured. The post-cured samples were tested for compression set. All test results are included in the tables below.

TABLE 4

| | Curing Characteristics | | | |
|---|---|---|---|---|
| | Example: | | | |
| | 9 | CE 3 | 10 | CE 4 |
| 12 min. (CE 3 was 187° C.) | | | | |
| ML (Nm) | 0.153 | 0.068 | 0.182 | n/m |
| MH (Nm) | 0.824 | 1.328 | 0.904 | n/m |
| MH – ML (Nm) | 0.671 | 1.260 | 0.722 | n/m |
| Tan d @ ML | 0.919 | 1.250 | 0.888 | n/m |
| Tan d @ MH | 0.144 | 0.064 | 0.169 | n/m |
| Ts2 (min.) | 2.1 | 3.7 | 6.6 | n/m |
| Tc50 (min.) | 2.7 | 5.5 | 7.7 | n/m |
| Tc90 (min.) | 6.6 | 10.6 | 10.8 | n/m |
| 30 min. | | | | |
| ML (Nm) | n/m | n/m | 0.182 | 0.478 |
| MH (Nm) | n/m | n/m | 1.192 | 1.420 |
| MH – ML (Nm) | n/m | n/m | 8.9 | 8.3 |
| Tan d @ ML | n/m | n/m | 0.888 | 0.551 |
| Tan d @ MH | n/m | n/m | 0.112 | 0.122 |
| Ts2 (min.) | n/m | n/m | 6.6 | 3.3 |
| Tc50 (min.) | n/m | n/m | 9.0 | 6.4 |
| Tc90 (min.) | n/m | n/m | 19.1 | 20.4 |

TABLE 5

| | Physical Properties | | | |
|---|---|---|---|---|
| | Example: | | | |
| | 9 | CE 3 | 10 | CE 4 |
| Press and Post Cured | | | | |
| Hardness Shore A-2 | 70 | 70 | 74 | 78 |
| Modulus 100% (MPa) | 3.5 | 4.5 | 8.1 | 10.3 |
| Tensile (MPa) | 7.3 | 7.9 | 14.9 | 12.9 |
| Elongation % | 304 | 198 | 197 | 137 |
| Compression Set | | | | |
| 70 h at 230° C. | 48 | 37 | 29 | n/m |
| 70 h at 290° C. | 59 | 47 | 45 | n/m |

Example 11

A quantity of 33.3 g of 40% tetrabutylphosphonium hydroxide in water (TBPOH 40%) was added to 1665 mL deionized (DI) water. To this mix, a quantity of 2000 g of latex (an aqueous latex containing 30 wt % of a copolymer of 62.5 mole percent (mol %) tetrafluoroethylene, 36.9 mol % perfluoromethylvinylether, and 0.6 mol % bromotrifluoroethylene, made via aqueous emulsion polymerization (Latex B)) was added dropwise while stirring. The blend was filtered through cheesecloth and washed three times with DI water. The resulting coagulum was dried overnight in an oven at 105° C. and then MDR traces and other testing was carried out as shown below in Table 6. For curing and physical property testing, a combination of 150 parts per hundred rubber (phr) fluoropolymer of this example was compounded with 20 phr carbon black (MT N-990 available from Degussa AG), 2.5 phr zinc oxide, 3.5 phr triallyl isocyanurate (available as Perkalink 301-50D from Nippon Kasei Chemical Co., Ltd.), 1.35 phr peroxide curative (Trigonox 101-50D from Akzo Nobel Chemicals, described as 2,5-dimethyl-2,5-di(tert-butylperoxy)hexane, powder, 50% with inert fillers) and 1 phr processing aid (Struktol WB-222, described as a highly concentrated, water free blend of high-molecular weight, aliphatic, fatty acid esters and condensation products, available from Struktol Company of America).

Comparative Example 5 (CE 5)

A quantity of 9 g of magnesium chloride was added to 1500 mL deionized (DI) water. To this mix, a quantity of 2000 g of Latex B (see Example 11) was added dropwise while stirring. The blend was filtered through cheesecloth and washed three times with DI water. The resulting coagulum was dried overnight in an oven at 105° C. and then MDR traces and other testing was carried out as shown below in Table 6. For curing and physical property testing, 150 parts per hundred rubber (phr) fluoropolymer of this comparative example material replaced the fluoropolymer in the compounding materials description of Example 11 and the other five materials were used as per Example 11.

TABLE 6

Curing Characteristics

| | Example: | |
|---|---|---|
| | 11 | CE 5 |
| $M_L$ (Nm) | 1.30 | 2.40 |
| $M_H$ (Nm) | 12.20 | 17.00 |
| $M_H - M_L$ (Nm) | 10.90 | 14.60 |
| Ts2 (min.) | 0.8 | 0.8 |
| Tc50 (min.) | 1.2 | 1.2 |
| Tc90 (min.) | 3.7 | 3.1 |

The samples of Example 11 and CE 5 were press cured 10 min at 170° Claim and were post cured 16 h at 230° C.

TABLE 5

Physical Properties

| | Example: | |
|---|---|---|
| | 11 | CE 5 |
| Press and Post Cured | | |
| Hardness Shore A-2 | 78 | 79 |
| Modulus 100% (MPa) | 5.2 | 13.1 |
| Tensile (MPa) | 7.5 | 16.6 |
| Elongation % | 195 | 125 |
| Compression Set | | |
| 70 h at 200° C. | 29 | 41 |

It is apparent to those skilled in the art from the above description that various modifications can be made without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of manufacturing a perhalogenated polymer comprising coagulating a latex comprising polymer particles using an onium compound as a coagulating agent, the polymer particles consisting essentially of interpolymerized units of one or more perhalogenated comonomer(s) and at least one cure site monomer, wherein the coagulation is performed essentially free of metal ions or metal salts, optionally wherein the latex is prepared in a system substantially free of fluorinated emulsifier.

2. The method of claim 1 further comprising washing the polymer; and optionally drying the polymer.

3. The method of claim 1 wherein the onium compound has the formula:

$$R_k Q^{(+)} X^{(-)}$$

wherein each R is, independently, hydrogen or a substituted or unsubstituted $C_1$-$C_{20}$ alkyl, aryl, aralkyl, or alkenyl group, Q is N, P, S, As, Sb; k is one more than the valence of Q; and X is OH, Br, Cl, HCOO, R'COO or OR' wherein R' is a $C_1$-$C_{10}$ alkyl, which may be fluorinated or nonfluorinated.

4. The method of claim 1 wherein the onium compound is selected from ammoniums, phosphoniums, and sulfoniums.

5. The method of claim 1 wherein the onium compound is selected from a tetraalkylonium hydroxide, a tetraalkylonium alkoxide, a tetraalkylonium carboxylate, and a tetrabutylphosphonium hydroxide, wherein each alkyl group in the tetraalkylonium is independently $C_1$-$C_{10}$.

6. The method of claim 1 wherein the latex is prepared by polymerizing one or more perfluorinated comonomer(s) together with at least one cure site monomer with a fluorinated emulsifier and an initiator, optionally wherein the initiator comprises ammonium persulfate.

7. The method of claim 6 wherein polymerizing is carried out in an aqueous medium.

8. The method of claim 1 wherein cure site monomer is selected from a nitrogen-containing cure site monomer, a nitrile-containing cure site monomer, or a halogenated cure site monomer.

9. The method of claim 1 wherein the polymer comprises a nitrogen-containing cure site monomer and the polymer is capable of curing without adding further components.

10. The method of claim 1 further comprising drying the polymer, and shaping the polymer, and optionally curing the dried, shaped polymer, optionally wherein shaping forms a sheet, hose, gasket, or O-ring.

11. The method of claim 10 further comprising blending a curative with the perfluoropolymer, optionally wherein the curative is selected from amidine salts, peroxides, ammonium salts, ammonia-generating compounds, substituted triazine derivatives, unsubstituted triazine derivatives, peroxides, bis-aminophenols, bis-amidooximes, and organotin compounds.

12. The method of claim 1 wherein the perhalogenated polymer includes below about 10,000 parts per billion metal ions and metal salts.

13. The method of claim 1 wherein the perhalogenated polymer includes below about 1000 parts per billion metal ions and metal salts.

14. The method of claim 1 wherein the cure site monomer is a compound selected from:
$CF_2=CFO(CF_2)_LCN$; $CF_2=CFO(CF_2)_uOCF(CF_3)CN$;
$CF_2=CFO(CF_2)_5CN$;
$CF_2=CFO[CF_2CF(CF_3)O]_q(CF_2O)_yCF(CF_3)CN$;
$CF_2=CF[OCF_2CF(CF_3)]_tO(CF_2)_tCN$;
wherein L=2-12; q=0-4; r=1-2; y=0-6; t=1-4, and u=2-6; and perfluoro(8-cyano-5-methyl-3,6-dioxa-1-octene).

* * * * *

UNITED STATES PATENT AND TRADEMARK OFFICE
CERTIFICATE OF CORRECTION

PATENT NO. : 7,304,115 B2 Page 1 of 1
APPLICATION NO. : 11/025290
DATED : December 4, 2007
INVENTOR(S) : Guy Van Gool It is certified that error appears in the above-identified patent and that said Letters Patent is hereby corrected as shown below:

Column 12
Line 11, in (Table 4), delete "ML" and insert -- $M_L$ --, therefor.
Line 12, in (Table 4), delete "MH" and insert -- $M_H$ --, therefor.
Line 13, in (Table 4), delete "MH-ML" and insert -- $M_H$-$M_L$ --, therefor.
Line 14, in (Table 4), delete "ML" and insert -- $M_L$ --, therefor.
Line 15, in (Table 4), delete "MH" and insert -- $M_H$ --, therefor.
Line 20, in (Table 4), delete "ML" and insert -- $M_L$ --, therefor.
Line 21, in (Table 4), delete "MH" and insert -- $M_H$ --, therefor.
Line 22, in (Table 4), delete "MH-ML" and insert -- $M_H$-$M_L$ --, therefor.
Line 23, in (Table 4), delete "ML" and insert -- $M_L$ --, therefor.
Line 24, in (Table 4), delete "MH" and insert -- $M_H$ --, therefor.

Signed and Sealed this

Sixth Day of January, 2009

JON W. DUDAS
*Director of the United States Patent and Trademark Office*